UNITED STATES PATENT OFFICE.

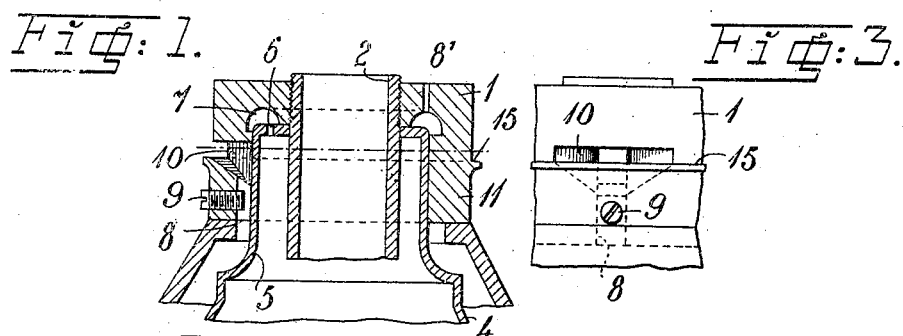
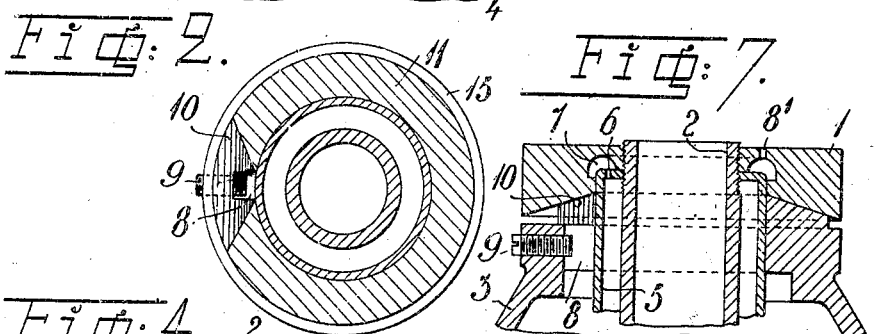
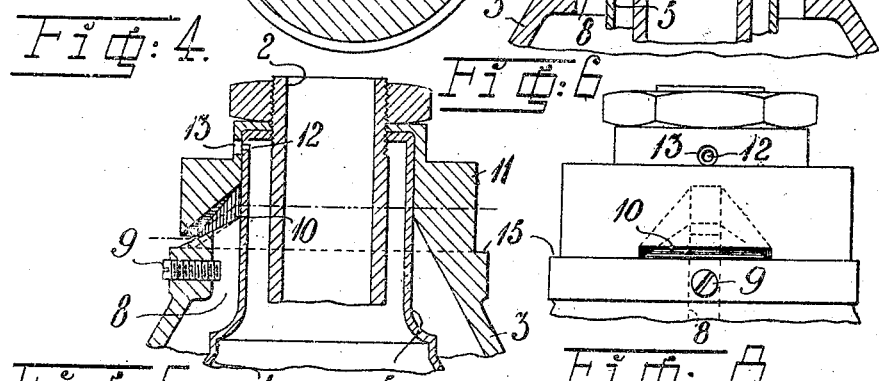
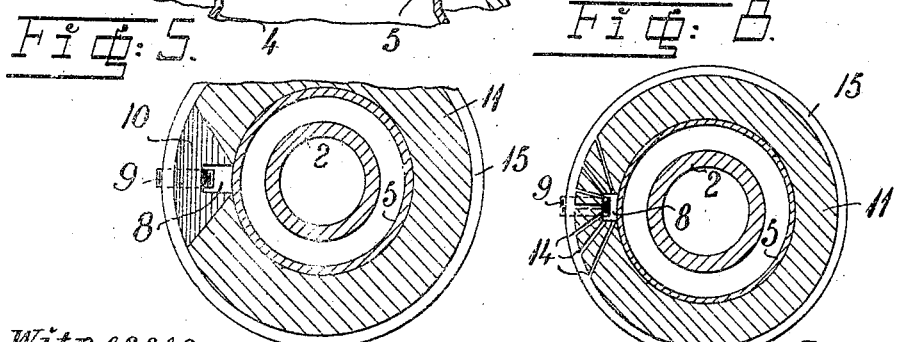

ALGOT LEVIN CHRISTENSON, OF STOCKHOLM, SWEDEN.

BLUE-MILK OUTLET IN CENTRIFUGAL SEPARATORS.

971,593.   Specification of Letters Patent.   Patented Oct. 4, 1910.

Application filed April 29, 1907. Serial No. 370,850.

*To all whom it may concern:*

Be it known that I, ALGOT LEVIN CHRISTENSON, a subject of the King of Sweden, and resident of Stockholm, in the Kingdom of Sweden, have invented new and useful Improvements in Blue-Milk Outlets in Centrifugal Separators, of which the following is a specification, reference being had to the drawing accompanying and forming a part hereof.

In centrifugal machines for separating milk it is of importance that the ejected jet of milk is of the least possible density so that it does not offer any great resistance to the surrounding air but easily turns aside for the same. It has been tried to gain this result by dividing the outlet in a plurality of passages or by making the outlets in the form of horizontal slits in order to, thereby, decrease the density of the out-flowing jet or jets. If, however, a screw for regulating the size of the outlet is placed therein, which is often the case, the said arrangements are not at once applicable, inasmuch as the width of the outlet is, thereby, dependent of the diameter of the milk screw, which diameter cannot be extended beyond a certain limit.

The present invention has for its object to make it possible to provide, in outlets with milk screw, an extended outlet for the said purpose.

The invention consists, chiefly, in providing one or more passages or outflow-openings extending from the groove in which the screw enters, said passages or openings having a larger cross-section than the said groove. The passage or outlet opening suitably widens outwardly, and the widening can be obtained in such a manner that the outer outlet opening is given the form of a horizontal slit. In order to cause the milk to completely spread in the widened passage, so as to fill the outer mouth, one or more spreaders may be inserted in the inner part of the passage, or the passage may, in itself, have an oblique direction upwardly or downwardly so that the milk meeting the oblique surface is caused to spread in a horizontal direction and fill up the outlet opening. Inasmuch as, in an outlet of the said kind, the oblique spreading planes must have a considerably large extension in radial direction, the metal should be thickened in the part, where the outlet is arranged. The groove with the screw as well as the widened outlet is, therefore, suitably arranged for instance in the nut situated at the top of the drum, said nut having usually the desired thickness, or the neck of the drum or the mantle is especially thickened. The thickened part, if such is needed, cannot advantageously be made in the form of a nipple or other projecting part or shoulder, since, if placed outwardly, it causes a considerable resistance to the air and, placed at the interior, it causes inconveniences in the manufacturing. According to this invention the thickened part is, therefore, made in the form of an annular flange of a suitable cross-section placed exteriorly or interiorly, or made integral with the drum. In the drawing I have shown by way of example some embodiments of an outlet of the said kind.

Figure 1 is a central vertical section of the upper part of a centrifugal drum having a blue-milk outlet embodying the invention formed in the upper nut of the drum. Fig. 2 is a horizontal section of the same drum showing the outlet in plan. Fig. 3 is a front view of the said outlet. Figs. 4, 5 and 6 are similar views of a second form of construction in which the outlet is formed in the upper part of the neck of the drum. Fig. 7 is a central vertical section of the upper part of a centrifugal drum showing an embodiment of the outlet in which the upper side thereof is formed by the slanting lower side of the nut. Fig. 8 is a horizontal section of the upper part of a centrifugal drum having the outlet formed by a number of passages extending radially from a groove in the neck of the drum.

Referring to Figs. 1, 2 and 3, the outlet is placed in the nut 1 joining the parts of the centrifugal drum. The nut 1 is screwed on the central tube 2 and bears, in the manner illustrated in the drawing, on the outer cap 3 as well as on the extension 5 of the upper plate 4 surrounding the tube 2. The cream rising inside the said extension enters in a known manner through the opening 6 into the annular space 7 and thence through the opening 8'. The blue milk rising at the outer side of the upper plate escapes through the blue-milk-outlet forming the subject matter of this invention. This outlet is arranged in the interior of the nut 1 and is downwardly formed by the groove 8, the width of which is regulated by the screw 9 inserted therein from without so as to make it possible to regulate the quantity of milk running through the said groove. Extending from above the screw 9 is the widened outlet 10 having the form indicated in Figs. 2 and 3. The side-walls of the outlet thus extend from the sides of the groove 8 in a direction extending obliquely outwardly, whereby the outlet seen from without suitably obtains the form of a horizontal slit, as shown in Fig. 3. In order to cause the milk rising through the groove 8 to spread toward the sides in the outlet 10 and completely fill the extended horizontal outlet opening, the lower side of the outlet is made slanting upwardly, as shown in the drawing. The milk actuated by the centrifugal force arrives at the slanting plane and is caused by the latter to spread, as will be easily understood.

According to the embodiment illustrated and above described the outlet widens symmetrically toward both sides of the groove 8 but, if preferred, the widened part may be located at one side only. It is, further, obvious that the outlet opening proper need not have the form of a horizontal slit but may be formed in any other suitable manner.

Referring to Figs. 4, 5 and 6, the boss 11 containing the outlet 10 is situated in the upper part of the cap or neck 3 of the centrifugal drum. The cream outlet is in this case formed in a known manner by two coinciding openings 12 and 13 in the extension of the upper plate 4 and the neck of the drum. The milk outlet arranged according to this invention has in this case a direction extending obliquely from the top downward, when followed from within outwardly, the upper oblique surface in this case serving as a spreader. In order to cause the rising milk to meet the said upper surface the lower surface should, suitably, be sloping or have another form such that its inner edge is situated sufficiently above the outer, lower edge of the upper surface.

Referring to Fig. 7, the lower side of the nut 1 forms the slanting surface of the outlet 10 necessary for the spreading. The said side of the nut is, namely, formed conical in shape, as shown in the drawing, and bears on the correspondingly shaped upper edge of the cap or neck 3 of the drum. Cut in the latter, from the top thereof, is the opening forming the outwardly widened outlet 10. This constructional form is especially practical on account of the facility of manufacturing same.

The invention might also be carried out as shown in Fig. 8 which illustrates a number of bored or otherwise formed passages 14 extending radially from the groove 8, said passages being also adapted to produce the desired spreading and distribution, though not in such a degree as those hereinbefore described forming a continuous space.

Each embodiment illustrated comprises a throwing-off flange 15 situated immediately below the outlet for causing the milk to better slip from the outer side of the drum. Such an annular flange may also be situated above the outlet opening 10 so that a channel is formed between the said flange and the lower one 15. Through the action of the centrifugal force a considerable vacuum arises in the said channel, said vacuum facilitating the streaming of the milk through the opening 10 and its spreading in the channel.

The slanting surfaces of the outlet need not be smooth, as illustrated in the drawing, but may as well be broken or sinuous or otherwise so formed that the spreading of the milk will be as complete as possible.

Having now described my invention, what I claim as new and desire to secure by Letters Patent is:—

1. The combination with a centrifugal drum having an outlet, of a regulating screw entering the inner part of the said outlet, and a part forming, beyond the said screw, an outer part of the outlet which is wider than the inner one, whereby the fluid spreads out in the said outer part of the outlet, before leaving the drum, substantially as and for the purpose set forth.

2. The combination with a centrifugal drum having an outlet, of regulating means situated in the inner part of the said outlet, and means for causing the fluid to spread in the outer part of the said outlet, substantially as and for the purpose set forth.

3. The combination with a centrifugal drum having an outlet, of regulating means adapted to be moved into and out from the inner part of the said outlet, and fluid spreaders situated within a widened outer part of the said outlet, substantially as and for the purpose set forth.

4. The combination with a centrifugal drum having an outlet in the neck thereof, of a screw entering the said outlet, and a thickened part having an outwardly widening outlet opening extending from the outlet in the neck of the drum, substantially as and for the purpose set forth.

5. The combination with a centrifugal drum having an outlet in the neck thereof, of a screw entering the said outlet, the outer part of the said outlet forming a plurality of passages, substantially as and for the purpose set forth.

In testimony whereof I have signed my name to this specification in the presence of two subscribing witnesses.

ALGOT LEVIN CHRISTENSON.

Witnesses:
 SIGURD DAHL,
 ERIK PUNDBERG.